June 30, 1964

T. S. SPRAGUE ETAL 3,139,070

VAPOR GENERATING UNIT

Filed Jan. 31, 1961

3 Sheets-Sheet 1

INVENTORS
Theodore S. Sprague
Johannes H. Ammon
Bertrand N. McDonald
BY
ATTORNEY June 30, 1964
T. S. SPRAGUE ETAL
3,139,070
VAPOR GENERATING UNIT
Filed Jan. 31, 1961
3 Sheets-Sheet 2
FIG. 2
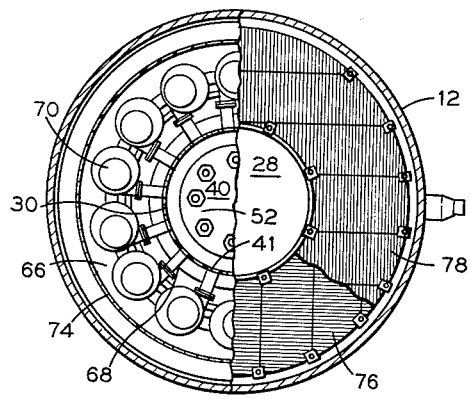
FIG. 3
FIG. 4
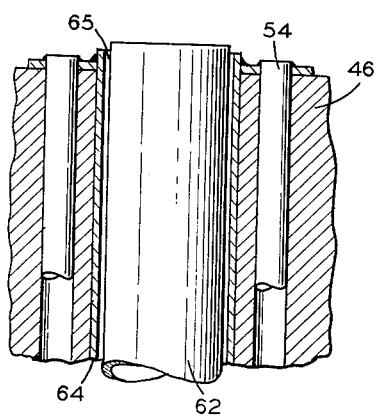
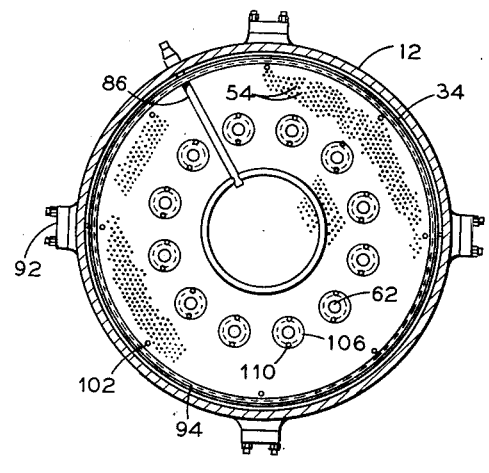
*INVENTORS*
Theodore S. Sprague
BY  Johannes H. Ammon
Bertrand N. McDonald
*ATTORNEY*

June 30, 1964  T. S. SPRAGUE ETAL  3,139,070
VAPOR GENERATING UNIT

Filed Jan. 31, 1961  3 Sheets-Sheet 3

*INVENTORS*
Theodore S. Sprague
Johannes H. Ammon
Bertrand N. McDonald
BY  *J. Moran*
ATTORNEY United States Patent Office 3,139,070
Patented June 30, 1964

3,139,070
VAPOR GENERATING UNIT
Theodore S. Sprague, Hudson, and Johannes H. Ammon and Bertrand N. McDonald, Akron, Ohio, assignors to The Babcock & Wilcox Company, New York, N.Y., a corporation of New Jersey
Filed Jan. 31, 1961, Ser. No. 86,218
1 Claim. (Cl. 122—34)

This invention relates in general to a vapor generating unit, and more particularly, it relates to a shell and tube type vapor generating unit in which the heat is supplied by a high temperature vapor flowing through the tubes.

The vapor generating unit of the present invention is contained within a vertically elongated pressure vessel of circular cross section and comprises a bundle of vertically extending tubes communicating between a lower and an upper chamber. Vertically extending plate means, which are located within the vessel about the bundle of tubes, form an interior vapor generation chamber and an annular shaped downcomer located between the plate means and the wall of the pressure vessel. A vapor-liquid collection space is formed in the upper part of the vapor generation chamber above the bundle of tubes. Circumferentially spaced vapor-liquid separating means are arranged within the upper portion of the pressure vessel exteriorly of the plate means and in communication with the vapor-liquid collection space. In operation the vapor-liquid mixture formed within the vapor generation chamber flows into the collection space and then into the separating means from whence separated vapor passes to a point of use and separated liquid returns to the downcomer. After its downward flow through the downcomer the separated liquid enters the vapor generation chamber at its base and passes upwardly therethrough wherein it is heated by indirect heat transfer with high temperature vapor flowing inside of the tubes.

The various features of novelty which characterize this invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

Figure 1:
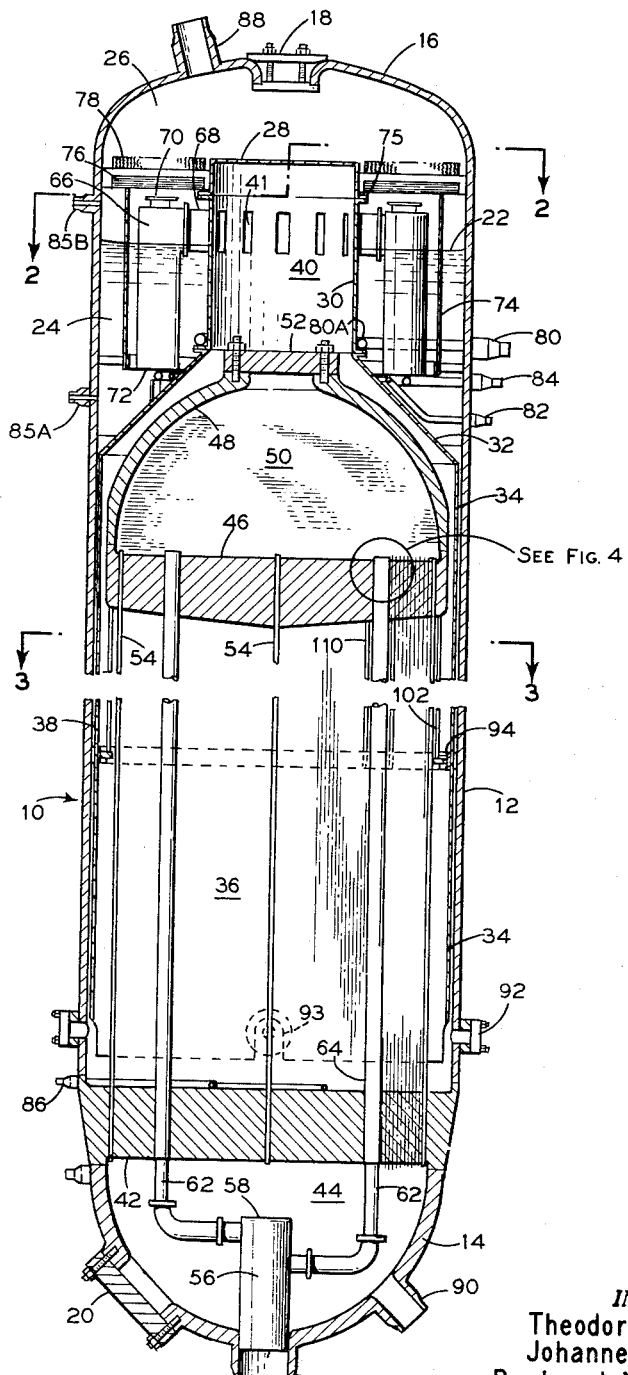
Figure 5:
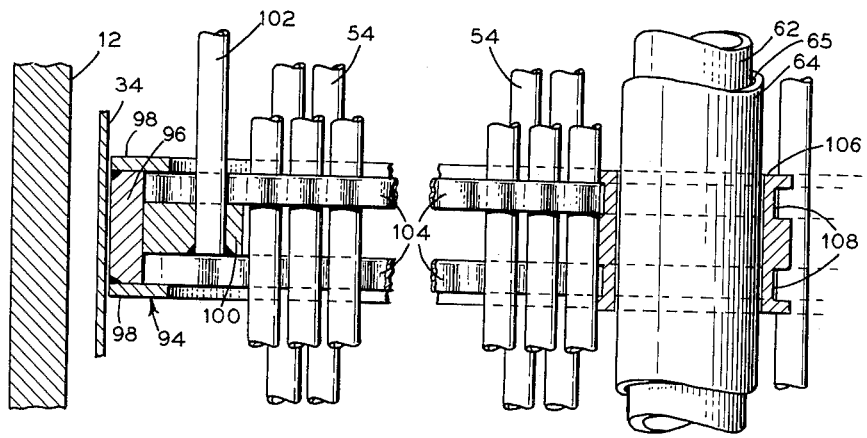
Figure 6:
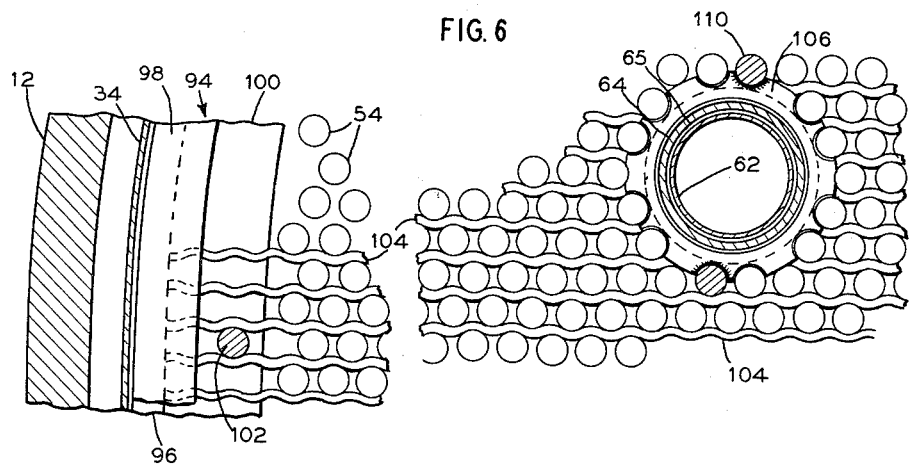

Of the drawings:
FIG. 1 is a vertical section of the preferred embodiment of the vapor generating unit;
FIG. 2 is a horizontal section taken along line 2—2 of FIGURE 1;
FIG. 3 is a horizontal section taken along line 3—3 of FIGURE 1;
FIG. 4 is a greatly enlarged vertical section of that portion of the upper tube sheet shown circled in FIGURE 1;
FIG. 5 is an enlarged vertical section of FIG. 1 showing the tube spacer arrangement, and
FIG. 6 is an enlarged horizontal cross section of the spacer arrangement for the tubes of FIGURE 1.

In the drawings the various parts of the vapor generating unit maintain the same reference numerals in different figures.

The vapor generating unit 10 has a vertically elongated pressure vessel 12 having a lower hemispherical head 14 and an upper dished head 16 closing the ends thereof. Access is provided to the interior of the vessel through manhole openings 18, 20 in the upper and lower heads respectively. During operation of the vapor generating unit 10 there is maintained within the pressure vessel 12 a normal liquid level 22 which divides the vessel into a lower liquid space 24 and an upper vapor space 26.

Plate means including plates 28, 30, 32 and 34, with the walls of the pressure vessel 12 combined to form a vapor generation chamber 36 and an annular shaped downcomer 38. The plate 34 which forms the lower portion thereof is closely spaced from the wall 12 of the pressure vessel. At the top of the vapor generation chamber, plates 28 and 30 form a cylindrically shaped vapor-liquid collection space 40 having a number of openings 41 circumferentially spaced in the wall 30. Frusto-conically shaped plate 32 provides a transition section between the upper part of the vapor generating chamber 36 and its vapor-liquid collection space 40.

Below the plate 34 a horizontally arranged lower tube sheet 42 is connected integral with the pressure vessel and forms, in combination with the lower head 14, an outlet chamber 44. Above the lower tube sheet 42 and within the vapor generation chamber 36 an upper tube sheet 46 is positioned with its periphery spaced closely inward from the inner face of the plate 34. A downwardly directed hemispherically shaped wall section 48, disposed within the vapor generation chamber 36 is secured about its periphery to the upper tube sheet 46 thereby forming an inlet chamber 50. Access to the inlet chamber is gained through a bolted cover 52 attached to the top of the wall section 48.

Within the vapor generation chamber 36 vertically extending tubes 54 arranged as a tube bundle extend between and through the lower and upper tube sheets 42 and 46, and communicate with the outlet and inlet chambers 44 and 50 respectively. In the outlet chamber 44 a header 56, closed by its end 58, extends downwardly through outlet opening 60 in the lower head 14 of the pressure vessel. Risers 62 connected to the header 56 within the outlet chamber 44 extend upwardly therefrom passing through the lower tube sheet 42 within the bundle of tubes 54 and then through the upper tube sheet 46 to open into the inlet chamber 50. Throughout their length between the lower face of the lower tube sheet 42 and the upper face of the upper tube sheet 46 the risers 62 are enclosed by tubular sleeves 64 which are attached to the tube sheets (see FIG. 4) to form an annular flow space 65 about the risers.

The upper tube sheets 46 and the wall section 48, which in combination form the inlet chamber 50, are supported by the bundle of tubes 54 and the sleeves 64, allowing the chamber 50 to float and thereby permitting the tubes and inlet chamber and the pressure vessel 12 to expand independently of each other.

In the upper part of the pressure vessel a plurality of hollow upright whirl chamber type vapor-liquid separators 66 are circumferentially arranged between the plate 30 and the pressure vessel 12. They communicate through conduits 68 and associated openings 41 with the vapor-liquid collection space 40. Each of the separators 66 has a vapor outlet opening 70 discharging into the vapor space 26 and a liquid outlet 72 for discharging the separated liquid downwardly within the liquid space 24 and into annular downcomer 38. A ring shaped plate section 74 encircles the separators 66 and in combination with flange 75 of the plate means 28 provides support for a pair of horizontally arranged vertically spaced ring shaped scrubbers 76, 78. These scrubbers 76, 78 are of the known corrugated plate type, but with the plates arranged so the corrugations in the two sets of scrubbers are at right angles to each other.

To maintain a substantailly constant volume of vaporizable fluid in the vapor generating unit 10, makeup fluid enters the liquid space 24 through inlet 80 and ring shaped header 80A which encircles plate 30 a short distance above the separated liquid outlet 72 of the separators 66. In addition chemical feed enters the liquid space through inlet 82. A blowdown connection 84 and associated piping is also provided in the liquid space immediately below the separator liquid outlet 72. There is a second blowdown connection 86 and necessary associated piping arranged within the bundle of tubes 54 immediately above the lower tube sheet 42 to remove any solids that might tend to collect in this area. Water gage connections 85A, 85B are situated in the pressure vessel 12 above and below the liquid level 22.

Outlet 88 is arranged in the upper head 16 to discharge separated vapor from the vapor space 26 to a point of use, while outlet 90 in the lower head 14 provides for discharge of fluid and, if present, noncondensable gases from the outlet chamber 44. Circumferentially spaced observation ports 92 are arranged in the pressure vessel 12 above the lower tube sheet 42 and in register with cut out portions 93 of the place 34 to afford inspection of the upper face of the lower tube sheet 42.

In view of the length to diameter ratio of the tubes 54 within the vapor generation chamber 36 a tube support arrangement is provided whereby tube spacing is maintained and vibration dampened without unduly restricting flow over the tubes. As shown in detail in FIGURES 5 and 6, a ring assembly 94 arranged in a horizontal plane encircles the bundle of tubes 54 within the vapor generation chamber 36. The ring assembly 94 is made up of a vertical section 96 capped top and bottom by horizontally arranged ring sections 98 which extend inwardly toward the tube bundle from the inner face of the section 96. Another horizontally arranged ring section 100 is attached to the inner face of vertical section 96 at its central portion and extends inwardly therefrom toward the bundle of tubes 54. The ring assembly 94 is dependently supported from the upper tube sheet 46 by a plurality of hanger rods 102 as shown in FIG. 1. Tube spacer members 104 extend chordally across ring assembly 94 between adjacent rows of tubes 54. Each spaced member is attached to the ring assembly 94 at least at one of its ends. To minimize the restriction to flow, adjacent spacer members 104 are situated in spaced horizontal planes. This is accomplished by having one spacer member attached to the ring section 96 between the ring section 100 and the lower section 98 while adjacent spacer members are attached to the ring section 96 between the ring section 100 and the upper section 98. Viewed in horizontal cross section as in FIG. 6 the spacer members 104 have a sinuous or corrugated configuration. The corrugations in the spacer members provide opposed curved surfaces in adjacent spacer members the recession of which tend to hold the tubes in position. Because of the location of the risers 62 within the tube bundle it is not possible for all of the tube spacer members 104 to extend completely across the bundle of tubes from one side of the ring assembly 94 to the other. To provide for this situation support collars 106, FIGS. 5 and 6 are arranged about the sleeves 65 which enclose the risers as the support for those particular tube spacer members, with parallel recesses 103 in the collar 106 to receive and support the interrupted tube spacer members 104. Additional hanger rods 110 dependently supported from the upper tube sheet 46 are attached to and provide support for the collars 106.

The vapor generating unit 10 shown in FIGURE 1 operates in the following manner: A high pressure, highly heated vapor such as high pressure steam is supplied to the unit through header 56. From the header the steam travels upwardly through the risers 62 and enters the inlet chamber 50. Within the inlet chamber the highly heated vapor is distributed to the tubes 54 and to the annular flow spaces 65 enclosing the risers 62 which open into the chamber 50 and flows downwardly therethrough to the outlet chamber 44. In its downward passage the vapor is condensed as it gives up heat to the vaporizable fluid contained in the vapor generating chamber 36 which is flowing counter currently outside the tubes. The condensed vapor flows from the tubes into the outlet chamber 44 and then leaves the unit through outlet 90.

The fluid which is to be vaporized flows downwardly from the liquid space 24 through the annular downcomer 38 and enters the vapor generation chamber 36 through the space between the lower end of the plate 34 and the upper face of the lower tube sheet 42. Within the vapor generation chamber the fluid to be heated flows upwardly in heat transfer relation over the exterior surface of the tubes 54 and 64 and is thereby heated to its saturation temperature, generating steam and forming a vapor-liquid mixture. After completing its passage over the tubes the vapor-liquid mixture flows radially across the under side of the upper tube sheet 46, entering the annular space formed by the exterior surface of inlet chamber 50 and plates 34 and 32, from whence it enters the vapor-liquid collection space 40, and flowing through the openings 41 and the conduits 68 enters the separators 66. Within the whirl chambers of the separators the vapor-liquid mixture is separated, with the vapor passing upwardly through outlets 70 into the vapor space 26, and the liquid flowing downwardly through outlets 72 into the liquid space 24. Within the vapor space 26 the separated vapor passes successively through scrubbers 76 and 78 wherein the corrugated plates arranged at right angles to each other provide maximum removal of entrained liquid from the vapor. From the scrubbers the vapor then flows to a point of use through the outlet 88.

In addition to the separated liquid which is returned by the outlets 72 to the liquid space, make up liquid substantially equal in weight to the amount of vapor withdrawn through outlet 88 is added through connection 80 in order to maintain the volume of liquid to be vaporized substantially constant within the vapor generating unit 10.

While this unit has been described as one in which heated vapor is used to impart heat to another fluid, it will be apparent to those skilled in the art that it is also possible to use a high pressure, high temperature liquid, such as liquid metal as the means for heating the vaporizable fluid flowing through the vapor generation chamber 36.

Advantageously, the flow circuitry of this unit provides an arrangement in which the surfaces contacted by the heating fluid are limited to the interior of the risers 62 and sleeves 64 and to the tubes 54 and the inlet and outlet chambers 50, 44. By thus limiting the surfaces contacted by the heating fluid a considerable saving is achieved when the heating fluid requires the use of stainless steel or other expensive alloys.

While in accordance with the provisions of the statutes the invention has been illustrated and described in the best form and mode of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

A vapor generating unit comprising wall means forming a vertically elongated pressure vessel of circular cross section arranged to operate with an upper vapor space above a body of liquid therein, a vapor outlet from said vapor space, plate means positioned within and coacting with said pressure vessel wall means to form an interior vertically elongated vapor generation chamber including a vapor-liquid collection chamber disposed at its uppermost portion and an annular shaped downcomer passage exterior of said chamber within the lower portion of said vessel, said plate means extending downwardly to substantially the bottom of said vapor generation chamber, said downcomer arranged for the downward flow of liquid in said body of liquid to supply said vapor generation chamber, a plurality of hollow upright whirl chamber type vapor-liquid separators disposed within said pressure vessel and positioned between said pressure vessel and said plate means, said separators arranged to receive a vapor-liquid mixture from said vapor-liquid collection chamber and each having a downwardly directed liquid outlet opening located in said body of liquid and an upwardly directed vapor outlet opening located in said vapor space, a first tube sheet located within said pressure vessel below said vapor generation chamber and integrally attached to said walls to form in combination therewith an outlet chamber, a second tube sheet located within said vapor generating chamber, a curved wall section positioned within said vapor generation chamber above said second tube sheet and attached thereto to form an inlet chamber, a bundle of vertically extending tubes arranged to substantially fill the transverse cross section of said vapor generation chamber and having the lower ends of said tubes fitted into said first tube sheet and opening to said outlet chamber and the upper ends of said tubes fitted into said second tube sheet and opening to said inlet chamber, a header having a closed end thereof positioned within said outlet chamber and extending exteriorly of said vessel, a number of uniformly spaced risers connected into said header within said outlet chamber and extending upwardly therefrom through said bundle of tubes and opening into said inlet chamber, and a sleeve arranged in co-axial alignment with and disposed about each of said riser tubes to form an annular passageway therebetween, each of said sleeves connected at its lower end to said first tube sheet and at its upper end to said second tube sheet so that the annular passageway communicates between said outlet and inlet chambers, and blow-down means disposed superjacent said first tube sheet to remove deposited solids therefrom.

References Cited in the file of this patent

UNITED STATES PATENTS

| | | |
|---|---|---|
| 1,090,144 | Guimont | Mar. 17, 1914 |
| 2,088,931 | Sengstaken | Aug. 3, 1937 |
| 2,174,318 | Ellis | Sept. 26, 1939 |
| 2,229,344 | Schneider | Jan. 21, 1941 |
| 2,268,730 | Vagt | Jan. 6, 1942 |
| 2,845,906 | Gram | Aug. 5, 1958 |
| 2,862,479 | Blaser et al. | Dec. 2, 1958 |

FOREIGN PATENTS

| | | |
|---|---|---|
| 566,747 | Belgium | Apr. 30, 1958 |